Jan. 12, 1937.   C. A. JAMES   2,067,701
REFLECTING GLASS
Original Filed June 27, 1933   2 Sheets-Sheet 1
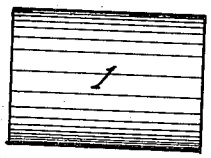
Fig. 1.
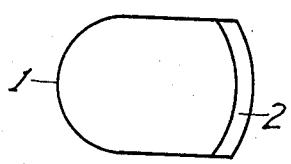
Fig. 2.
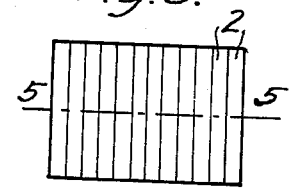
Fig. 3.
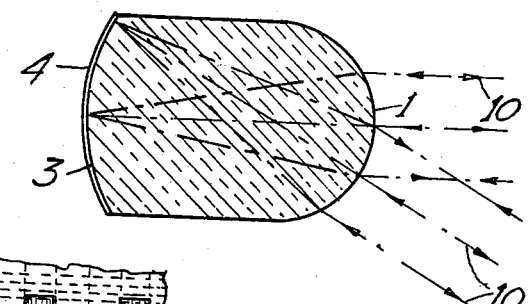
Fig. 4.
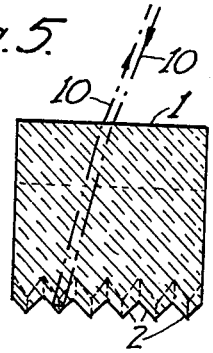
Fig. 5.
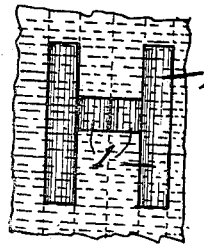
Fig. 6.
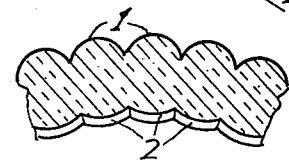
Fig. 7.
Fig. 8.
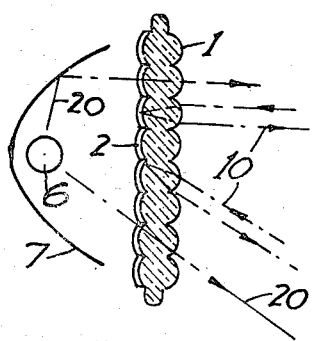
Fig. 9.
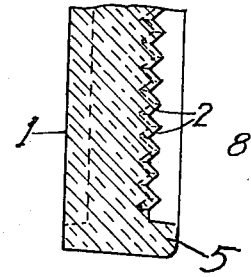
Fig. 10.
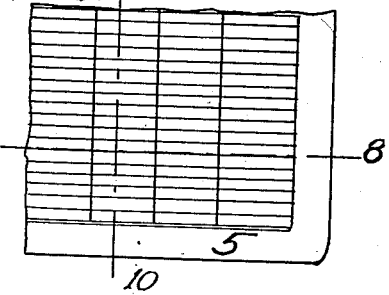
Fig. 11.
Cleveland A. James
Inventor.

Jan. 12. 1937. C. A. JAMES 2,067,701
REFLECTING GLASS
Original Filed June 27, 1933 2 Sheets-Sheet 2

Cleveland A. James.
Inventor.

Patented Jan. 12, 1937

2,067,701

UNITED STATES PATENT OFFICE 2,067,701

REFLECTING GLASS

Cleveland A. James, Philadelphia, Pa., assignor to A. M. Ducey, Toledo, Ohio

Application June 27, 1933, Serial No. 677,812
Renewed March 25, 1936

18 Claims. (Cl. 88—82)

This invention relates to reflectors made of pressed glass, and to such a reflector as will return incident light back to its source. A pressed glass reflector embodying the features of this invention may be used in highway danger or caution signs, or in the tail lamp of an automobile or other vehicle, where it will be illuminated by the light from the headlights of an approaching car and warn the driver of the approaching car of possible danger; or it may be used in letters or signs illuminated by light from an outside source.

Briefly, the reflecting unit embodying the features of this invention comprises a solid piece of pressed glass whose face is cylindrical and whose back is composed of a plurality of curved right-angle grooves, the centres of the cylindrical face and of the curved grooves being identical, the relation between the lengths of the two radii being dependent upon the refractive index of the glass. The cylindrical face focuses incident light in a line along the grooves, whence it is reflected back thru the face and back to its source. When the axis of the cylindrical face is vertically positioned then the lateral range of reflection is dependent upon the angular value of the arc of the cylinder. The vertical range of reflection depends upon whether or not the surfaces of the curved grooves are silvered. A pressed glass reflector embodying the features of this invention may comprise a single reflecting unit of varying length or a plurality of such units.

The principle of the reflector of this invention is the same as that of the "double mirror" described by Dr. A. Beck in the November, 1887, number of "Zeitschrift fur Instrumentenkunde", (referred to by S'raubel in his Patents Nos. 835,648, November 13, 1906, and 897,174, August 25, 1908) and as that of the signalling device of H. Vanderbeek, No. 1,377,161, May 3, 1921. While the surfaces of these two devices are plane surfaces at right angles to one another, the surfaces of the reflector of this invention are curved about a line at right angles to the plane bisecting their included angle, so that the surfaces are conical surfaces.

The proper functioning of a lens or other device thru which light is transmitted is largely dependent upon the mold in which the glass is pressed. Thus, in the early days of the manufacture of automobile head-light cover-glasses, it was found that a solid mold was not suitable in pressing some designs of glass. A glass mold must be cleaned and polished periodically. The cleaning of a solid mold rubbed holes into the forming surfaces and rounded the projecting edges. It was very difficult to polish the depressions in the mold face. All the resulting flaws in the mold surfaces were pressed into the glass so that the function of the cover-glass was destroyed. To correct these faults the cover glass manufacturers devised a sectional mold that could be easily taken apart and cleaned and accurately polished. An object of this invention is to provide a pressed glass reflector that may be pressed in a sectional mold so that the surfaces of the glass itself may be as nearly as possible optically true.

Faults in the surfaces of the glass molds, especially in reflector-forming surfaces, produce like faults in the glass itself. Such flaws cause a scattering of the light transmitted thru the glass. The reflecting surfaces of a glass reflector might be deliberately distorted or marred in order to secure, by the scattering of the reflected light, a wider range of visibility. This does not seem necessary or desirable. Even with highly polished mold forming surfaces pits and waves and other imperfections appear on the surfaces of the glass, these being due to unequal expansion and contraction between the mold and the glass, to improper manipulation of the glass in pressing or to flaws such as bubbles within the glass itself. Even in the manufacture of optical glass it is impossible to produce a flawless batch of glass so that only from 10% to 20% of the optical glass output is fit for use. In a cheap glass, such as is used in lenses and reflectors, homogeneity is impossible so that seed and bubbles are always present. It is therefore advantageous to make a glass reflector dependent for its reflectivity on only two surfaces. A triple reflector can be made that is very efficient in the return of light to its source. The chance of error in the relative positioning of three surfaces and the loss of efficiency due to the scattering of the reflected light by reason of inherent faults in the glass is much greater in a triple reflector than in a double reflector. Another object of this invention is to produce a glass reflector that returns light to its source by a series of two-surface reflectors.

The primary object of a glass reflector embodying the features of this invention is to return light to its source. Many causes produce scattering of the reflected light. The interference and illumination of seed and bubbles or of the finely divided motes of coloring material in suspension in the glass; or optical heterogeneity due to the variation of the refractive index throughout the body of the glass and caused by inadequate heat treatment, or caused by chemical heterogeneity due to faulty stirring and other unsatisfactory conditions during heating and melting:—all of these produce a scattering of the reflected rays. With these faults ever present it is advantageous to make the reflecting surfaces as few and as easily machined as possible so as to eliminate as far as possible those surface flaws caused by the inherent faults of glass as a workable material and by its manipulation during the course of manufacture.

Considering the projecting portions of a mold face the points of a solid trihedral angle are more quickly destroyed by heat than are the edges of dihedral grooves. In the latter the heat flow is faster, and the area thru which the heat must escape is greater, so that the life of dihedral edges is much longer than that of trihedral projections.

Another object of this invention is to provide a reflecting glass that can be pressed in a mold least affected by the high temperatures to which it is subjected.

A still further object is to provide a glass reflector that may be pressed in a spherical or cylindrical shape.

Reflecting glass embodying the features of this invention has elasticity of design. It may be made in the form of a reflecting stud or button such as are ordinarily used in traffic signs. Or it may be in rods that may be bent to form letters or other characters. It may be pressed in panels for use as danger signals, or in backing up cutouts in signs. By the proper design of the cylindrical portions of the face reflecting glass letters may be produced. Made in a cylindrical shape several pieces may be assembled to form a lantern globe. And it is well suited for use as a cover glass for a vehicular tail-lamp, reflecting light incident from without back to its source and transmitting light from within the lamp.

The drawings illustrate embodiments of the invention and the views therein are as follows:

Figures 1, 2 and 3 are a face view, end view and rear view respectively of a reflecting unit.

Figure 4 is a section thru a glass reflector.

Figure 5 is a section on line 5—5 of Fig. 3.

Figure 6 is a fragmentary view of a reflecting panel, portions of the face cylinders being omitted so that those remaining are in the form of letters.

Figure 7 is a section of a curved reflecting plate made up of a plurality of reflecting units.

Figure 8 is a section thru a portion of a flat reflecting plate, being a section on line 8—8 of Figure 11, while Figure 10 is a section on line 10—10 of Figure 11.

Figure 9 illustrates the use of glass embodying the features of this invention as the cover glass for a tail- or other lamp.

Figure 12:
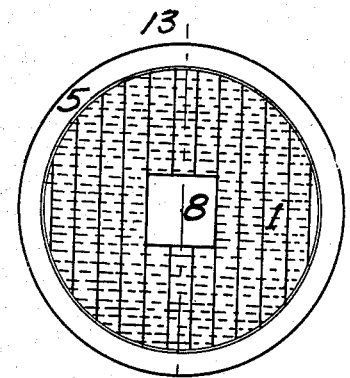
Figure 12 is a face view.

According to well-known laws governing reflection by a double reflector having its two surfaces at right angles, the incident and the reflected rays of light lie in parallel planes, these planes being parallel with the joining line of the two surfaces. If the source of light lies in a plane at right angles to both surfaces, then a reflected ray is parallel with its incident ray and it is returned toward its source. If the double reflector is curved, having its two surfaces always at right angles, then an incident ray lying in a radial line will be reflected in a radial line; and if the incident ray is angularly situated with respect to a radius, then the reflected ray will make a like angle with the radius on the opposite side from the incident ray. When light strikes a curved double reflector having its surfaces at right angles then the incident and the reflected rays are symmetrical about the radius of the reflector at the point of incidence.

Figure 4 shows a reflector having a curved front face, (cylindrical), 1, and a cylindrical back, 3, with reflecting means, 4, provided. The curved back surface, 3, has a radius such that a pencil of light, 10, is concentrated in a line at the back surface; and each ray of the pencil is reflected from this surface symmetrically opposite its incident path. The front surface and the back surface have a common centre. The radii of the two cylindrical surfaces bear the relation to one another such that the radius of the front face equals the radius of the back surface multiplied by a value equal to the refractive index of the glass minus one.

The construction as illustrated in Figure 4 will return light rays in lines parallel with their incident paths when the source of the light lies in a plane transversely at right angles to the double-cylinder structure. Should incident light make an angle with the transverse plane then the curved single back surface will not return a ray of light longitudinally parallel with its incident path, altho the incident and the reflected rays will be transversely parallel. To correct this the curved double reflectors, 2—2, are introduced. How a reflected ray is returned longitudinally parallel with its incident path is illustrated in Figure 5.

The reflecting unit as illustrated in Figures 1, 2, 3 and 5 may be of variable length, short if it is to be used as a reflecting button in signs, or long if it is to be bent into the shape of a letter or other character.

If the cylindrical front face is removed incident light is scattered laterally to an extent dependent upon the value of the angular curvature of the back surfaces. A panel made up of a plurality of the units with the cylindrical faces omitted will have a "spotty" appearance to an observer; while it may have a wide lateral range of visibility on both sides of the source of illumination only a small portion of the incident light is reflected to a given point. If suitable portions of the cylindrical faces are replaced the area so provided will reflect incident light in a beam back to its source. In Figure 6 the letter formed by the cylindrical portions, 1—1, will appear, when illuminated, brilliantly visible against a less visible background.

A plurality of the units embodying the features of this invention may be pressed in the form of a cylindrical plate so that several such plates may be assembled for use as a lantern globe. A fragmentary view (sectional) of such a plate is shown in Figure 7. The curved surfaces of this invention lend themselves to such a design that the angular length of a curved plate may be well above 100 degrees.

In using the reflector of this invention the cylinders of the front face will ordinarily be positioned vertically. The angular value of the curve of a cylinder depends entirely upon the desired lateral range of reflection. The vertical range of reflection is dependent upon the critical angle of internal reflection of the glass, that is, if the reflecting surfaces are unsilvered. With unsilvered surfaces the range of total reflection up and down from the normal will not exceed 5 degrees, although internal reflection continues to an appreciable degree. When the reflectors of this invention are incorporated in a tail-lamp cover-glass then this angle must suffice. When a greater vertical reflecting range is desirable then the reflecting surfaces may be silvered.

Figure 9 shows a cross-section thru a cover-glass for a tail-lamp in which the cylindrical faces, 1, and the curved double reflectors, 2, are incorporated. The bulb, 6, is backed up by reflector, 7. Rays of light, 10, from without are returned to their source. Rays, 20, from the electric bulb are transmitted thru the glass as in an ordinary cover glass. When the bulb of such a combination ceases to function then the cover glass continues its function as a warning signal by reflecting incident light from without back to its source.

In a reflecting panel such as is shown in Figures 8, 10 and 11 it is sometimes desirable to provide a flanged rim, 5. This facilitates the mounting and serves to provide clearance between the curved surfaces 2 and the back of the frame in which the panel is mounted.

A mould for the back surfaces of the reflector of this invention may be made of a solid block of metal, the reflector-forming surfaces being cut by raising the block against a cutter of small radius having an included angle of 90 degrees. It is much more satisfactory, however, to use a sectional mold, a section extending between the outstanding edges of two adjacent double reflectors. The plate sections may then be machined in pairs quickly and accurately, the tool used being in the form of a countersink having an included angle of 90 degrees.

In the design of a plate reflector of glass embodying the features of this invention many modifications are possible. The units may be contiguous as shown in the drawings. Figures 5 to 11.

Figure 13:
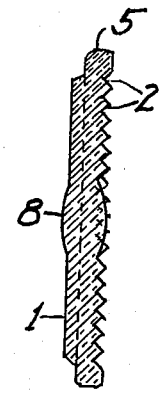
Figure 13 is a sectional view of a tail-lamp cover glass in which a central lens portion has been provided.
Figure 16:
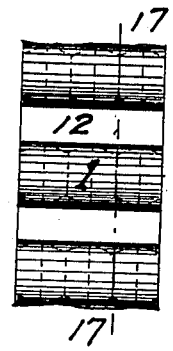
Figure 16 is a face view and Figure 17 a sectional view of a reflector in which non-reflecting areas have been interposed between the rows of reflecting units.
Figure 17:
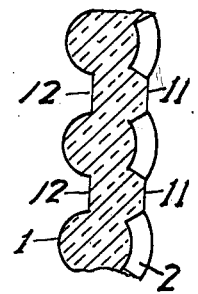

In a cover glass it may be desirable to separate the units allowing an area between for the free passage of light from the bulb. Or a lens in front of the bulb may be entirely surrounded by the reflecting units as illustrated in Figures 12 and 13 in which 8 is the lens. These and other modifications may be made without departing from the invention herein claimed and described.

Figures 16, 17, 18 and 19 show how non-reflecting areas may be interposed between rows of the curved double reflectors. Surfaces 11 and 12 form an area of glass with parallel faces thru which light may pass with no refraction.

It is possible by varying slightly the angular relation of the two surfaces of a double reflector from 90 degrees to return a spreading beam back toward the source of the light, depending upon the scattering of the rays due to the inherent flaws in the glass to produce a more or less solid beam. However, it is difficult, working with so imperfect a medium as reflector glass, to secure optically true surfaces even if the mold surfaces are true, and such a deformed design is not advisable.

Figure 20:
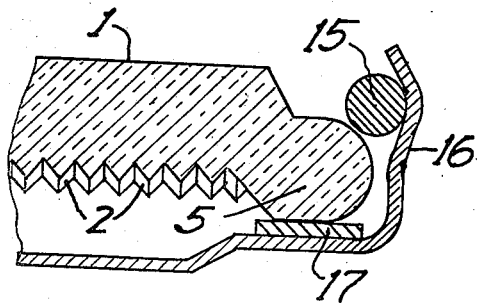
Figure 20 is a fragmentary sectional view of a reflector in its mounting.

Figure 20 is a fragmentary sectional view of a glass reflector mounted in a metal case, 16, and held in position by a spring ring, 15, the cork ring, 17, being inserted to take up shock and inequalities of bearing.

Figure 14:
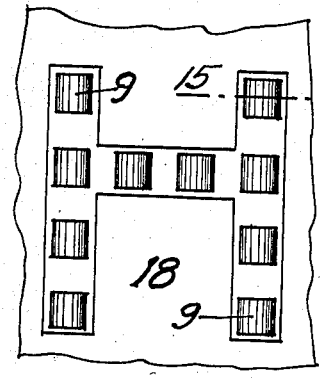
Figure 14 is a face view illustrating the use of reflecting buttons according to this invention in letters in signs.
Figure 15:
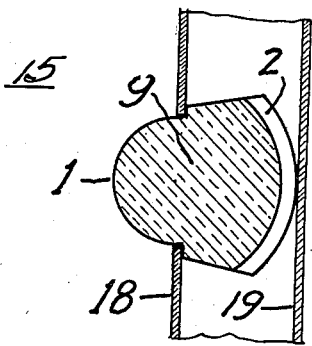
Figure 15 is a section view of a single button.
Figure 18:
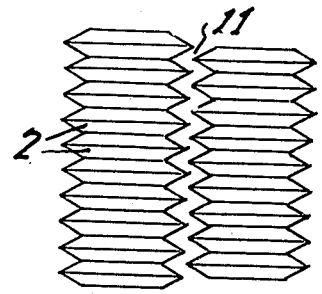
Figures 18 and 19 are a face view and a sectional view of a reflector in which also non-reflecting areas have been interposed between the rows of reflecting units.
Figure 19:
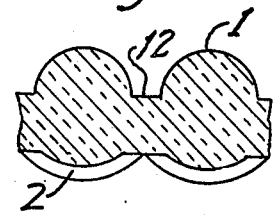

The reflectors embodying the features of this invention are made in the form of reflecting buttons, the cylindrical faces will project thru the face of the sign or housing with fastening means provided behind. In Figures 14 and 15 the faces of the buttons 9—9 project through the metal face 18, the shoulders on the buttons being held against the face, 18, by the back, 19, of the housing. In an auxiliary tail-light for a vehicle a stamped metal case may be used, the reflecting glass being held in place by a spring wire ring, as shown in Figure 20.

What I claim is:

1. A reflector of pressed glass having its front and rear faces convexly cylindrical, the front face being smooth and the rear face comprising a plurality of curved double reflectors, the front face and the double reflectors being curved about a common centre line and arranged in collimating relation, whereby light entering the front face is converged upon the double reflectors and returned therefrom back through the face toward its source.

2. A pressed glass reflecting area built up of a plurality of contiguous reflectors, each reflector having a smooth convexly cylindrical front face and a convexly cylindrical rear face comprising a plurality of curved double reflectors, the front face and the double reflectors being curved about a common centre line and arranged in collimating relation, whereby light entering the front face is converged upon the double reflectors and returned therefrom back through the face toward its source.

3. A pressed glass plate in which is incorporated a plurality of reflectors each having a smooth, convexly cylindrical front face and a convexly cylindrical rear face comprising a plurality of curved double reflectors, the front face and the double reflectors being curved about a common centre line and arranged in collimating relation, whereby light entering the front face is converged upon the double reflectors and returned therefrom back through the face toward its source.

4. A reflector of pressed glass having a smooth convexly cylindrical front face and a convexly cylindrical rear face comprising a plurality of curved double reflectors, the two surfaces of each double reflector being substantially at right angles to one another, the front face and the double reflectors being curved about a common centre line and arranged in collimating relation, whereby light entering the front face is converged upon the double reflectors and returned therefrom back through the face toward its source.

5. A pressed glass reflecting area for returning light to its source comprising a plurality of contiguous units each unit having a smooth, convexly cylindrical front face and a convexly cylindrical rear face built up of a series of curved double reflectors, the two surfaces of each double reflector being substantially at right angles to one another, the front face and the double reflectors being curved about a common centre line and arranged in collimating relation.

6. A pressed glass plate in which is incorporated a plurality of reflecting units each unit having a smooth, convexly cylindrical front face and a convexly cylindrical rear face comprising a plurality of curved double reflectors, the two surfaces of each double reflector being substantially at right angles to one another, the front face and the double reflectors being curved about a common centre line and arranged in collimating relation, whereby light entering the front face is converged upon the double reflectors and returned therefrom back through the face toward its source.

7. A curved pressed glass reflecting area for returning light to its source comprising a plurality of contiguous units each unit having a smooth convexly cylindrical front face and a convexly cylindrical rear face built up of a series of curved double reflectors, the two surfaces of each double reflector being substantially at right angles to one another, the front face and the double reflectors being curved about a common centre line and arranged in collimating relation.

8. A curved pressed glass plate in which is incorporated a plurality of reflecting units each unit having a smooth, convexly cylindrical front face and a convexly cylindrical rear face comprising a plurality of curved double reflectors, the two surfaces of each double reflector being substantially at right angles to one another, the front face and the double reflectors being curved about a common centre line and arranged in collimating relation, whereby light entering the front face is converged upon the double reflectors and returned therefrom back through the face toward its source.

9. A reflector of pressed glass for returning incident light to its source having a smooth, convexly cylindrical front face and a convexly cylindrical rear face built up of a series of curved double reflectors, the two surfaces of each double reflector being substantially at right angles to one another, the front face and the double reflectors being curved about a common centre line and arranged in collimating relation, the radius of the cylindrical front face having a value equal to the radius of the joining line of the surfaces of a double reflector multiplied by the refractive index of the glass minus one.

10. A tail-lamp cover glass formed to reflect rays of light from one side thereof, and to pass rays of light from the other side thru the same, comprising a plurality of auto-collimating reflecting units, the smooth front face and the rear face of each unit being convexly cylindrical and curved about a common center line, the rear face comprising a plurality of curved double reflectors, whereby light entering the front face of a unit is converged upon the double reflectors and returned therefrom back through the face toward its source.

11. A tail-lamp cover glass formed to reflect rays of light from one side thereof, and to pass rays of light from the other side thru the same, in which is incorporated a plurality of reflecting units each having a smooth, convexly cylindrical, front face and a convexly cylindrical rear face comprising a plurality of curved double reflectors, the two surfaces of each double reflector being substantially at right angles to one another, the front face and the double reflectors being curved about a common center line and arranged in collimating relation, whereby light entering the front face is converged upon the double reflectors and returned therefrom back through the face and toward its source.

12. A plate glass reflector comprising a plurality of auto-collimating units having smooth, convexly cylindrical, front faces and convexly cylindrical rear faces comprising a plurality of curved double reflectors, the front faces and the double reflectors being curved about common center lines, and undeformed glass areas interposed between the reflecting units.

13. A tail-lamp cover glass formed to reflect rays of light from one side thereof, and to pass rays of light from the other side thru the same, comprising a plurality of reflecting units each reflecting unit having a smooth, convexly cylindrical, front face and a convexly cylindrical rear face comprising a plurality of curved double reflectors, the two surfaces of each double reflector being substantially at right angles to one another, the front face and the double reflectors being curved about a common center line and arranged in collimating relation, whereby light entering the front face of a unit is converged upon the double reflectors and returned therefrom back through the face toward its source and non-reflecting areas interposed between the reflecting units.

14. The combination with a case of sheet metal or other material of a pressed glass reflector comprising a plurality of auto-collimating units having convexly cylindrical, smooth, front faces and convexly cylindrical rear faces built up of a series of curved double reflectors, the two surfaces of each double reflector being substantially at right angles to one another.

15. A pressed glass reflector having its edges in the shape of a dished flange, its reflecting area comprising a plurality of auto-collimating units with smooth, convexly cylindrical, front faces and convexly cylindrical rear faces comprising a plurality of curved double reflectors, the two surfaces of each double reflector being substantially at right angles to one another.

16. In a reflector device of the character described, a unitary transparent body having its front light-receiving face formed with a longitudinally extending condensing rib arcuate in transverse cross-section and having its rear face formed with a series of substantially contiguous double reflector teeth disposed in collimating relation with said condensing rib, said teeth having alternating peaks and valleys arcuately formed in a direction transverse to said longitudinally extending condensing rib about a longitudinal axis within said body and approximately containing the centers of the arcs of the surface of said condensing rib.

17. In a reflector device of the character described, a unitary transparent body having a series of substantially contiguous reflecting units, each of said units comprising a light condensing rib projecting from one side thereof and a series of substantially contiguous reflector teeth projecting from the other side of said body and extending transversely of said rib, the teeth of each series being in collimating relation with the rib of such series and comprising a plurality of curved double reflectors, each double reflector having its two reflecting surfaces disposed substantially at right angles to one another, the ribs of adjacent units being spaced from each other to provide light transmitting portions therebetween.

18. In a reflector device of the character described, a unitary transparent body having a reflecting unit, said unit comprising a light condensing rib projecting from one side thereof and a series of reflector teeth projecting from the other side of said body and extending transversely of said rib, the teeth being in collimating relation with the rib and comprising a plurality of curved double reflectors, each double reflector having its two reflecting surfaces disposed substantially at right angles to one another.

CLEVELAND A. JAMES.

CERTIFICATE OF CORRECTION.

Patent No. 2,067,701.  January 12, 193

CLEVELAND A. JAMES.

It is hereby certified that error appears in the printed specification of the above numbered patent requiring correction as follows: Page 3, second column, after line 9, insert the following paragraph:

> The term "glass" is used in my specification and claims in a broad sense to include any suitable transparent media.;

and that the said Letters Patent should be read with this correction therein that the same may conform to the record of the case in the Patent Office.

Signed and sealed this 16th day of February, A. D. 1937.

(Seal)

Henry Van Arsdale
Acting Commissioner of Patents.